UNITED STATES PATENT OFFICE.

WILLIAM C. LOCKWOOD, OF NEW YORK, N. Y.

SECONDARY BATTERY.

SPECIFICATION forming part of Letters Patent No. 512,253, dated January 2, 1894.

Application filed August 6, 1892. Serial No. 442,318. (No specimens.)

*To all whom it may concern:*

Be it known that I, WILLIAM C. LOCKWOOD, a citizen of the United States, residing at New York, in the county of New York and State of New York, have invented certain new and useful Improvements in Secondary Batteries; and I do declare the following to be a full, clear, and exact description of the invention, such as will enable others skilled in the art to which it appertains to make and use the same.

This invention relates to certain improvements in the method of constructing electrodes for electric storage or secondary batteries and it has, especially, for its object to improve the electrodes thereby, so as to give the same a most extended exposure of surface with a minimum weight. Generally, in this class of batteries such extended surfaces have been produced by mechanically roughening or extending the surface of the metal of the electrodes, by cutting the same, perforating the metal or forming pockets therein, and in some instances the exposure surface has been further increased by depositing upon a metallic electrode a suitable metal electrolytically. While such methods, in a measure, accomplish the object sought, they do not fully effect the purpose, as it is impossible to mechanically comminute or divide the metal of which the electrodes are formed, so as to secure the fullest electrolytic action thereupon.

My invention is designed to produce the electrodes for storage or secondary batteries by the electrolytic deposition of tin from a solution of a salt thereof, in such a comminuted state as to offer an extensive surface to the electrolytic fluid.

In practicing my invention, I first prepare a solution of chloride of sodium, or common salt, in water. Into such solution I, then, place a suitable quantity of chloride of tin, and insert in the solution and mass the electrodes of a galvanic battery, so as to apply a galvanic current to said solution and mass. The current causes an electrolytic deposition of metallic tin in a spongy, flocculent or puffy mass, which is the basis of my improved electrode.

In constructing a battery with my improved electrode a porous cell or cup may be placed in a glass or other suitable vessel, of greater diameter, and the spongy metal, produced as described, packed outside and within the porous cell or cup. Into the packed material are then introduced the terminals of two conductors, which are preferably of tin.

The battery is charged in the same manner as other storage batteries by connecting the electrodes with the conductors of a dynamo or other electric generator. When charged the battery may be employed to supply a current to a motor, light or other circuit.

Any number of cells thus constructed may be connected, in series, to form a battery the voltage of the whole being multiplied as the number of the cells is increased, modified only by the resistance of each particular cell, which will be immaterial, practically.

Among other advantages of my improved battery the capillary attraction of the spongy mass will hold the electrolytic fluid and prevent it from "slopping" or working over out of the cells, thus enabling me to produce a comparatively dry battery, and as the surface of the metal of the electrodes is extended to the greatest possible extent with a minimum weight of metal, I am enabled to produce a much lighter battery, with a greater amount of storage capacity than has heretofore been effected.

Having thus described my invention, what I claim, and desire to secure by Letters Patent, is—

The method herein described of constructing electrodes for storage batteries the same consisting in depositing metallic tin in a spongy or flocculent state from a solution of chloride of sodium and chloride of tin, by electrolytic action substantially as specified.

In testimony whereof I affix my signature in presence of two witnesses.

WM. C. LOCKWOOD.

Witnesses:
THEO. MUNGEN,
E. H. BOND.